(12) United States Patent
Righi et al.

(10) Patent No.: US 10,824,437 B1
(45) Date of Patent: Nov. 3, 2020

(54) PLATFORM MANAGEMENT FOR COMPUTING SYSTEMS WITHOUT BASEBOARD MANAGEMENT CONTROLLERS

(71) Applicant: American Megatrends International, LLC, Norcross, GA (US)

(72) Inventors: Stefano Righi, Lawrenceville, GA (US); Madhan B. Santharam, Duluth, GA (US); Arun Subramanian Baskaran, Duluth, GA (US)

(73) Assignee: American Megatrends International, LLC, Norcross, GA (US)

( * ) Notice: Subject to any disclaimer, the term of this patent is extended or adjusted under 35 U.S.C. 154(b) by 168 days.

(21) Appl. No.: 15/499,556

(22) Filed: Apr. 27, 2017

(51) Int. Cl.
| | |
|---|---|
| *G06F 9/4401* | (2018.01) |
| *H04L 12/24* | (2006.01) |
| *H04L 29/08* | (2006.01) |
| *H04L 29/06* | (2006.01) |
| *G06F 8/65* | (2018.01) |

(52) U.S. Cl.
CPC .............. *G06F 9/4416* (2013.01); *G06F 8/65* (2013.01); *H04L 41/082* (2013.01); *H04L 67/02* (2013.01); *H04L 67/34* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 2005/0010585 | A1* | 1/2005 | Sahinoja | H04L 41/0803 |
| 2012/0084552 | A1* | 4/2012 | Sakthikumar | G06F 21/572 |
| | | | | 713/100 |
| 2014/0280837 | A1* | 9/2014 | Ayanam | H04L 41/24 |
| | | | | 709/223 |
| 2014/0289570 | A1* | 9/2014 | Lewis | G06F 11/3089 |
| | | | | 714/43 |
| 2017/0052854 | A1* | 2/2017 | Yang | G06F 11/1469 |
| 2017/0322613 | A1* | 11/2017 | Lin | G06F 1/3209 |

OTHER PUBLICATIONS

Dell. (Aug. 2014) Integrated Dell Remote Access Controller 8 (iDRAC8) Version 2.00.00.00 RACADM Command Line Interface Reference Guide [PDF]. Rev. A00. Dell, Inc. Accessed from https://topics-cdn.dell.com/ on Jul. 1, 2020. (Year: 2014).*
Refish (R) API; Distributed Management Task Force, Inc. (2017); web page located at https://www.dmtf.org/standards/redfish.

* cited by examiner

*Primary Examiner* — Kim Huynh
*Assistant Examiner* — Joshua Neveln
(74) *Attorney, Agent, or Firm* — Newport IP, LLC

(57) ABSTRACT

A management server exposes a web services interface through which managed clients that are not equipped with baseboard management controllers ("BMCs") can submit management data at boot time. The firmware of the managed clients can receive management commands from the management server during boot time. The management server can also expose a web services interface to management clients through which the management clients can obtain the management data provided by the managed clients as if the management data were being provided through a BMC. The management server can also receive management commands from the management client computers for performance at the managed client computers. The management server queues the management commands for provision to the appropriate managed clients during the next boot of the managed clients.

18 Claims, 6 Drawing Sheets

PLATFORM MANAGEMENT FOR COMPUTING SYSTEMS WITHOUT BASEBOARD MANAGEMENT CONTROLLERS

BACKGROUND

Scalability in today's data center is increasingly achieved with horizontal, scale-out solutions, which often include large quantities of simple servers. The usage model of scale-out hardware is drastically different than that of traditional enterprise platforms and, therefore, requires a new approach to platform management.

The Distributed Management Task Force ("DMTF") has created a successor to previous manageability interfaces, called REDFISH. REDFISH is an open industry standard specification and schema for simple, modern, and secure management of scalable platform hardware, such as server computers located in data centers. The REDFISH specification and schema specifies a representational state transfer ("RESTful" or "REST") interface, and utilizes JAVASCRIPT object notation ("JSON") and the Open Data Protocol ("OData") to help integrate management solutions within existing toolchains.

In order to utilize the functionality provided by REDFISH, managed computer systems must include a baseboard management controller ("BMC"). A BMC is a specialized service processor that monitors the physical state of a computer, network server or other hardware device using sensors and communicating with a system administrator through an out-of-band ("OOB") network connection.

BMCs, however, are not practical for small computer systems such as desktop and laptop computers and, consequently, these types of computing systems do not include BMCs. As a result, it is not possible to utilize REDFISH or other management technologies that require a BMC to perform management functions on many types of computing systems and, as a result, these computing systems might be misconfigured or have out of date firmware, both of which might lead to security or performance issues.

It is with respect to these and other considerations that the disclosure made herein is presented.

SUMMARY

Technologies are described herein for providing platform management for computing systems without BMCs. Through an implementation of the technologies disclosed herein, platform management solutions that require a BMC, such as the DMTF's REDFISH, can be utilized with computing systems that are not equipped with a BMC. As a result, these computing systems can be better managed, thereby increasing the performance and/or security of these computing systems. Technical benefits other than those specifically mentioned herein can also be realized through an implementation of the disclosed technologies.

In one configuration, a management server computer (which might be referred to herein as the "management server") is provided that enables computing systems without BMCs to be utilized with platform management solutions that require a BMC. In order to provide this functionality, the management server exposes a web services interface through which managed client computers (which might be referred to herein as "managed clients") that are not equipped with BMCs can submit management data, such as data describing aspects of their configuration. For example, during the boot time of a managed client, a firmware of the managed client can gather management data and provide the management data to the interface exposed by the management server.

The firmware of the managed client can also receive management commands from the management server during boot time. For example, a managed client might receive a command to modify its configuration, to update the firmware, to recover a logical storage volume, or to initiate diagnostics on the managed client. The managed client can perform the management commands during its next boot.

The management server can also expose a web services interface to management client computers (which might be referred to herein as a "management client") through which the management clients can obtain management data provided by the managed clients as if the management data were being provided through a BMC. For example, and without limitation, the management server can provide an interface to the management clients that is compatible with the DMTF's REDFISH standard for platform management. The interfaces provided by the management server are implemented as REDFISH-compatible representational state transfer ("RESTful") interfaces over secure Hypertext Transfer Protocol ("HTTPS") that utilize a JavaScript Object Notation ("JSON") format that is based on the Open Data Protocol ("OData") in one particular configuration.

The interface exposed by the management server to the management clients can also receive management commands from the management client computers for performance at the managed client computers. In response to receiving management commands, the management server queues the management commands for provision to the appropriate managed clients during the next boot of the managed clients. In this manner, a management client computer that is configured for use with a BMC-equipped managed client can both obtain management data and provide management commands to managed client computers that are not equipped with BMCs.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing platform management for computing systems without BMCs. As discussed briefly above, through an implementation of the technologies disclosed herein, platform management solutions that require a BMC can be utilized with computing systems that are not equipped with a BMC. As a result, these computing systems can be better managed, thereby increasing the performance and/or security of these computing systems. Other technical benefits can also be realized through an implementation of the disclosed technologies. Additional details regarding these aspects will be provided below with regard to FIGS. 1-6.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
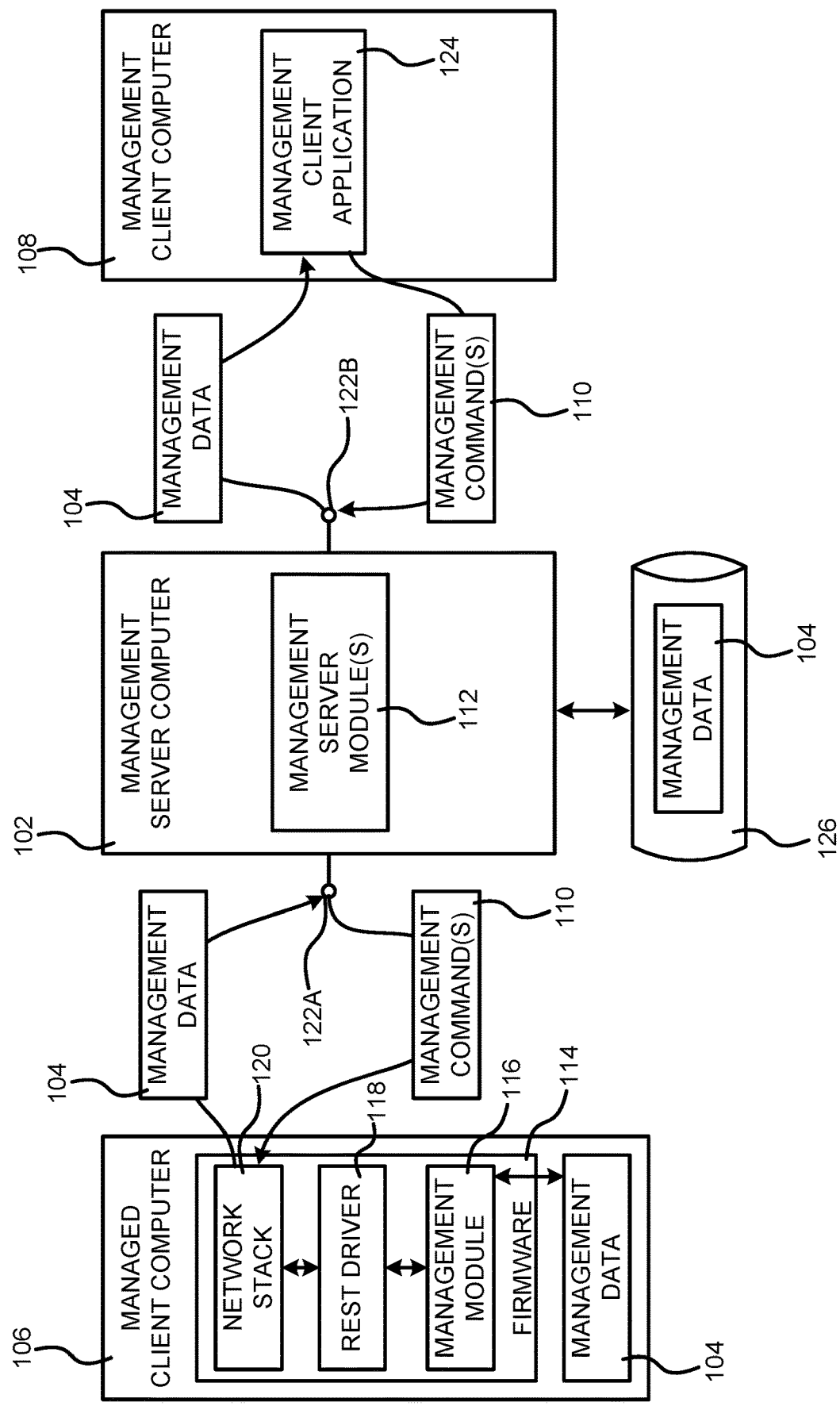
FIG. 1 is a software architecture diagram illustrating aspects of a mechanism for providing platform management for computing systems not equipped with BMCs, according to one or more configurations presented herein.

FIG. 1 is a software architecture diagram illustrating aspects of a mechanism for providing platform management for computing systems not equipped with BMCs, according to one or more configurations presented herein. As shown in FIG. 1, a management server computer 102 is provided that enables computing systems without BMCs to be utilized with platform management solutions that require a BMC, such as platform management solutions based upon the DMTF's REDFISH standard.

In order to provide the disclosed functionality, the management server 102 executes one or more software modules 112 (which might be referred to herein as "modules 112" or "management server modules 112"). In addition to other types of functionality, the modules 112 expose a web services interface 122A through which managed client computers 106 (which might be referred to herein as "managed clients") that are not equipped with BMCs can submit management data 104.

The management data 104 includes any type of data regarding the configuration or operation of the managed clients 106. For example, and without limitation, the management data 104 can include data describing the configuration of a firmware 114 executing on a management client computer 106. The management data 104 can also include data describing the operational characteristics of a managed client computer 106 such as, but not limited to, the temperature of one or more components of a managed client 106, speed of rotational components (e.g., spindle motor, CPU fan, etc.) within a managed client 106, the voltage across or applied to one or more components within a managed client 106, and the available and/or used capacity of memory or storage devices within a managed client 106. The management data 104 can also describe other aspects of the configuration and operational characteristics of a managed client computer 106.

In one configuration, a component of the firmware 114 of the managed client 106, referred to herein as the management module 116, can gather the management data 104, format the management data 104 (e.g. as JSON), and provide the management data 104 to the interface 122A exposed by the management server 102 during boot time of the managed client computer 106. In order to provide this functionality, the firmware 114 can include a network stack 120 and a REST driver 118 for establishing a network connection to the management server 102 and communicating via the interface 122A. As used herein, the term "boot time" refers to the time period after the firmware 114 begins executing and before the operating system of the managed client 106 starts to load.

As shown in FIG. 1, the firmware 114 of the managed client 106 can also receive management commands 110 from the management server 102 during boot time of the managed client 106. The management commands 110 are initiated from a management client application 124 executing on a management client computer 108. For example, and without limitation, a managed client 106 might receive a management command 110 from the management server 102 instructing the firmware 114 to modify its configuration, to update its firmware 114, to recover a logical storage volume (not shown in FIG. 1), or to initiate diagnostics on the managed client 106. The management client application 124 can be a web browser, a command line interface ("CLI"), or another type of infrastructure management solution. A compatible interface to a spreadsheet application can also be utilized in some configurations.

Other types of management commands 110 can be received and performed in a similar manner in other configurations. In one configuration, the firmware 114 of the managed client 106 performs the received management commands 110 during its next boot.

The management server 102 can also expose a web services interface 122B to management client computers 108 through which the management clients 108 can obtain management data 104 provided by the managed clients 106 as if the management data 104 were being provided directly by the managed clients 106 through a BMC. For example, and without limitation, the management server 102 can provide a web services interface 122B to the management clients 108 that is compatible with the DMTF's REDFISH standard for platform management. In this regard, it is to be appreciated that the interfaces 122A and 122B provided by the management server 102 can be implemented as REDFISH-compatible RESTful interfaces over HTTPS that utilize a JSON format that is based on the OData standard in one particular configuration. Other types of interfaces can be utilized in other configurations.

The interface 122B exposed by the management server 102 to the management clients 108 can also receive management commands 110 from the management client application 124 executing on the management client computers 108 for performance at the managed client computers 106. In response to receiving management commands 110, the management server 102 can queue the management commands 110 for provision to the appropriate managed clients 106 during the next boot of the managed clients 106. For example, and without limitation, the management server 102 can maintain a data store 126 for storing management data 104 received from the managed clients 106. The data store 126 can also be utilized to queue management commands 110 received from the management client computer 108 until the next boot of the managed client computer 106. The management server computer 102 can dequeue the management commands 110 after the management commands 110 have been provided to the managed client computer 106 during its next boot.

It is to be appreciated that using the mechanism described above, a management client computer 108 that is configured for use with a BMC-equipped managed client can both obtain management data 104 and provide management commands 110 to managed client computers 106 that are not equipped with BMCs. Additional details regarding this process will be provided below with regard to FIGS. 1-4.

It is also to be appreciated that FIG. 1 has been simplified for discussion purposes and that many other software and hardware components can be utilized to implement the functionality disclosed herein. For example, and without limitation, various networks and networking components can be utilized to connect the managed client computer 106 to the management server computer 102 and to connect the management client computer 108 to the management server computer 102. In this regard, it is also to be appreciated that while only a single managed client computer 106 and a single management client computer 108 have been illustrated in FIG. 1, many such computers can be utilized with the management server computer 102 in various configurations.

Figure 2:
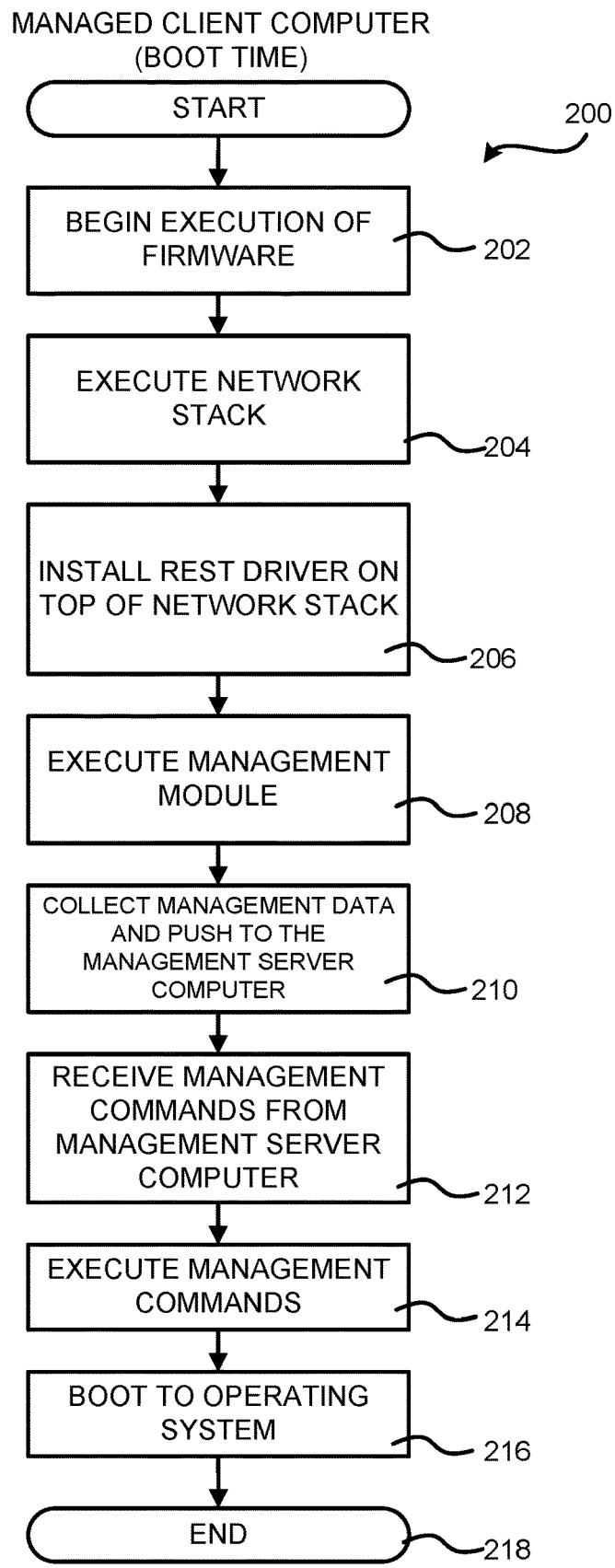
FIG. 2 is a flow diagram showing a routine that illustrates aspects of the operation of a managed client computer when utilized in conjunction with the mechanism shown in FIG. 1 for providing platform management for computing systems without BMCs, according to one configuration presented herein.

FIG. 2 is a flow diagram showing a routine 200 that illustrates aspects of the operation of the managed client computer 106 when utilized in conjunction with the mechanism shown in FIG. 1 for providing platform management for computing systems without BMCs, according to one configuration presented herein. It is to be appreciated that the logical operations described herein with respect to FIG. 2, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. Some or all of these operations can also be performed by components other than those specifically identified.

The routine 200 begins at operation 202, where the firmware 114 of the managed client 106 begins execution. This might occur, for example, immediately following the powering on or rebooting of the managed client computer 106. The routine 200 then proceeds to operation 204, where the network stack 120 of the firmware 114 is executed. As discussed above, the network stack 120 enables firmware components to communicate with the management server computer 102 over a suitable network connection. From operation 204, the routine 200 proceeds to operation 206, where the REST driver 118 is installed over the network stack.

As known to those skilled in the art, the EFI REST protocol is designed to be used by EFI drivers and applications to send and receive resources from a RESTful service. This protocol abstracts REST (Representational State Transfer) client functionality. This EFI protocol could be implemented to use an underlying EFI HTTP or HTTPS protocol, or it could rely on other interfaces that abstract HTTP or HTTPS accesses to the resources. The SendReceive( ) function of the REST driver 118 sends an HTTP or HTTPS request to the REST service, and returns a response when the data is retrieved from the service. RequestMessage contains the HTTP or HTTPS request to the REST resource identified by RequestMessage.Request.Url. The ResponseMessage is the returned HTTP or HTTPS response for that request, including any HTTP or HTTPS status.

From operation 206, the routine 200 proceeds to operation 208, where the management module 116 is executed. As discussed above, the management module 116 collects the management data 104 for the managed client computer 106 and posts the management data 104 to the management server computer 102 using the interface 122A. This occurs at operation 210. The managed client computer 106 can submit the management data 104 to the management server 102 using an HTTP POST command in some configurations.

From operation 210, the routine 200 proceeds to operation 212, where the management module 116 can also get management commands 110 from the management server computer 102 via the interface 122A. The managed client computer 106 obtains the management commands 110 from the management server 102 using an HTTP GET request in some configurations. If management commands 110 are received from the management server computer 102, the firmware 114 executes the management commands 110. As discussed above, the management commands 110 can be executed by the firmware 114 during the next boot of the managed client computer 106. The management commands 110 might alternatively be performed at another time, for example at a scheduled time.

From operation 214, the routine 200 proceeds to operation 216, where the managed client computer 106 boots to an operating system once the firmware 114 has completed its boot-time processing. The routine 200 then proceeds from operation 216 to operation 218, where it ends.

Figure 3:
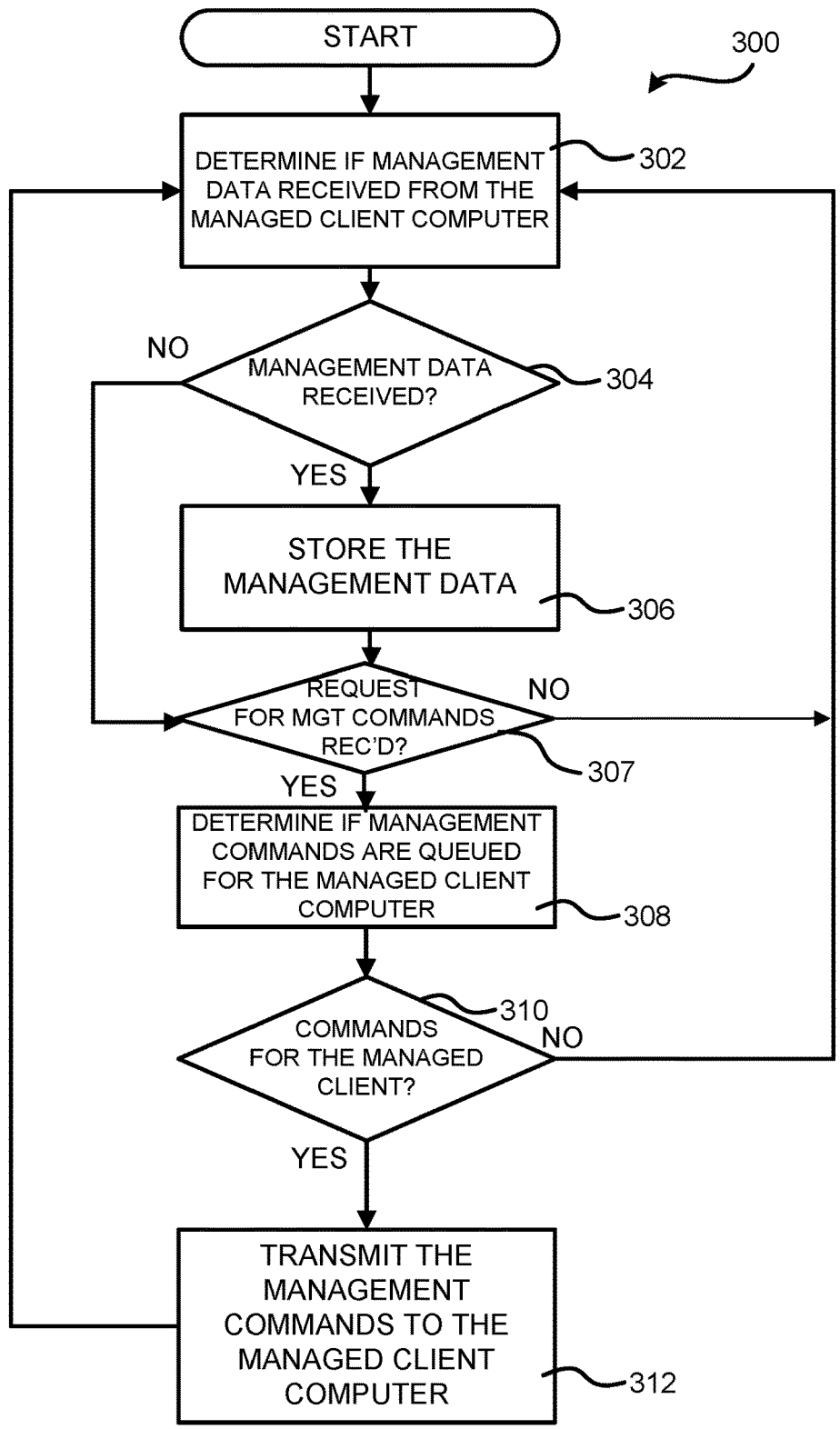
FIG. 3 is a flow diagram showing a routine that illustrates aspects of the operation of a management server computer when utilized in conjunction with the mechanism shown in FIG. 1 for providing platform management for computing systems without BMCs, according to one configuration presented herein.

FIG. 3 is a flow diagram showing a routine 300 that illustrates aspects of the operation of the management server computer 102 when utilized in conjunction with the mechanism shown in FIG. 1 for providing platform management for computing systems without BMCs, according to one configuration presented herein. In particular, FIG. 3 illustrates aspects of the operation of the management server 102 when communicating with a managed client computer 106.

The routine 300 begins at operation 302, where the management computer exposes the interface 122A to the managed client computer 106 and determines whether management data 104 has been received from the managed client computer 106 via the interface 122A. If management data 110 has not been received, the routine 300 proceeds from operation 304 to operation 308. If management data 110 has been received, the routine 300 proceeds from operation 304 to operation 306, where the management server computer 102 can store the management data 104 in the data store 126. The routine 300 then proceeds from operation 306 to operation 307.

At operation 307, the management server computer 102 determines if a request for management commands has been received from the managed client computer 106. If not, the routine 300 proceeds back to operation 302, where the management server computer 102 can once again determine whether management data 110 has been received from the managed client computer 106. If a request for management commands has been received from the managed client computer 106, the routine 300 proceeds from operation 307 to operation 308.

At operation 308, the management server computer 102 determines if management commands 110 have been previously queued that are intended for execution by the managed client computer 106. If no management commands 110 have been queued for the managed client computer 106, the routine 300 proceeds from operation 310 to operation 302, where the process described above can be repeated. If management commands 110 have been queued, the routine 300 proceeds from operation 310 to operation 312, where the management server computer 102 can provide the management commands 110 to the managed client computer 106. The routine 300 proceeds from operation 312 back to operation 302, where the process described above can be repeated.

Figure 4:
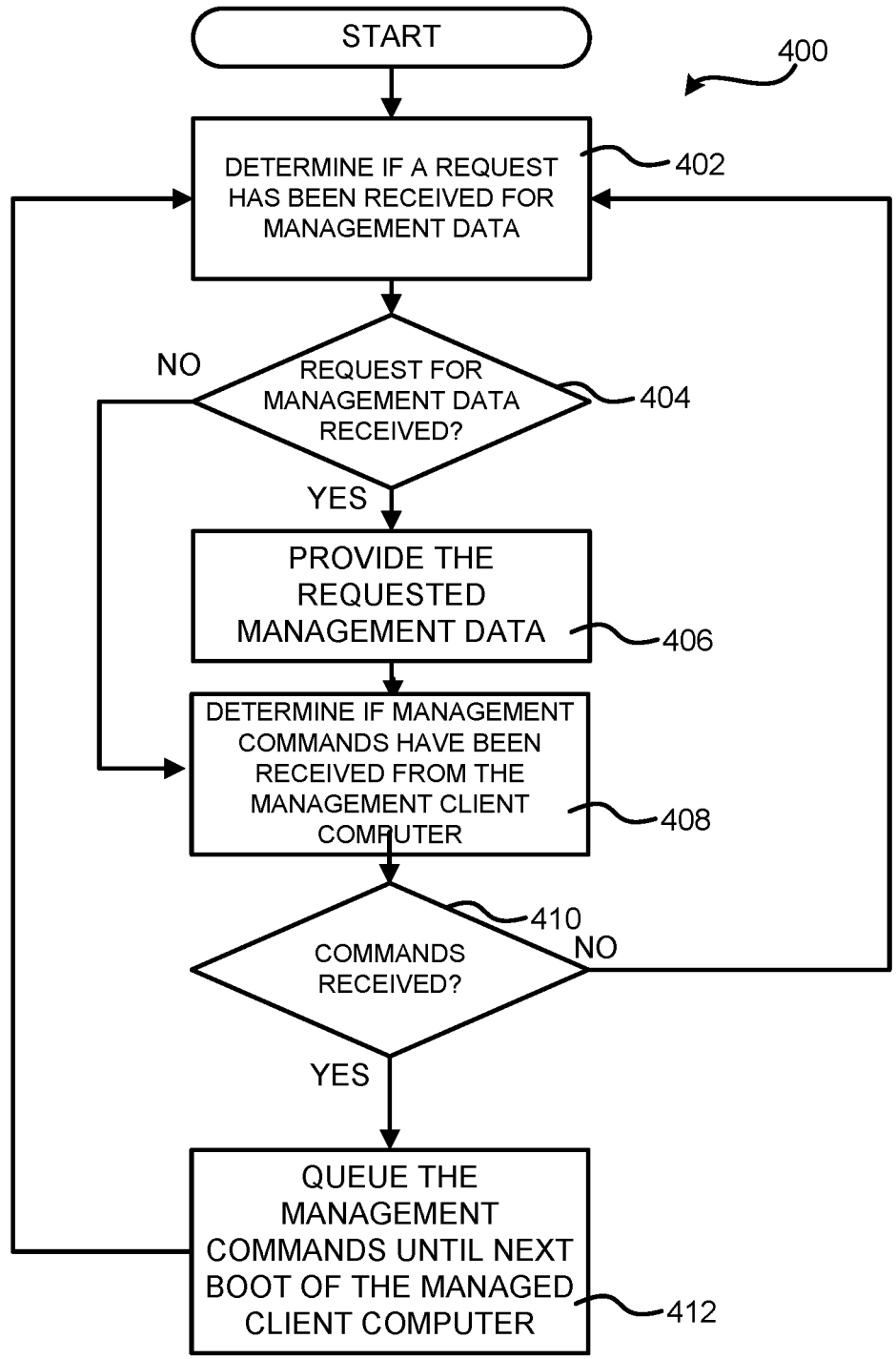
FIG. 4 is a flow diagram showing a routine that illustrates additional aspects of the operation of a management server computer when utilized in conjunction with the mechanism shown in FIG. 1 for providing platform management for computing systems without BMCs, according to one configuration presented herein.

FIG. 4 is a flow diagram showing a routine 400 that illustrates additional aspects of the operation of the management server computer 102 when utilized in conjunction with the mechanism shown in FIG. 1 for providing platform management for computing systems without BMCs, according to one configuration presented herein. In particular, FIG. 4 illustrates aspects of the operation of the management server 102 when communicating with a management client computer 108.

The routine 400 begins at operation 402, where the management server 102 determines whether a request (e.g. an HTTP GET request) for management data 104 has been received from a management client application 124 executing on a management client computer 108. If such a request has not been received, the routine 400 proceeds from operation 404 to operation 408. If such a request has been received, the routine 400 proceeds from operation 404 to operation 406, where the management server 102 retrieves the requested management data 110 from the data store 126 and provides the data 110 in response to the request. The routine 400 then proceeds from operation 406 to operation 408.

At operation 408, the management server 102 determines if management commands 110 have been received (e.g. via an HTTP POST command) from the management client application 124 executing on the management client computer 108. If management commands 110 have not been received, the routine 400 proceeds from operation 410 to operation 402, where the process described above can be repeated. If management commands 110 have been received, the routine 400 proceeds from operation 410 to operation 412, where the management server computer 102 queues the received management commands 110 for provision to the managed client computer 106 during its next boot. For example, and without limitation, the managed server computer 102 might store the management commands 110 in the data store 126. The routine 400 then proceeds from operation 412 back to operation 402, which was described above.

Figure 5:
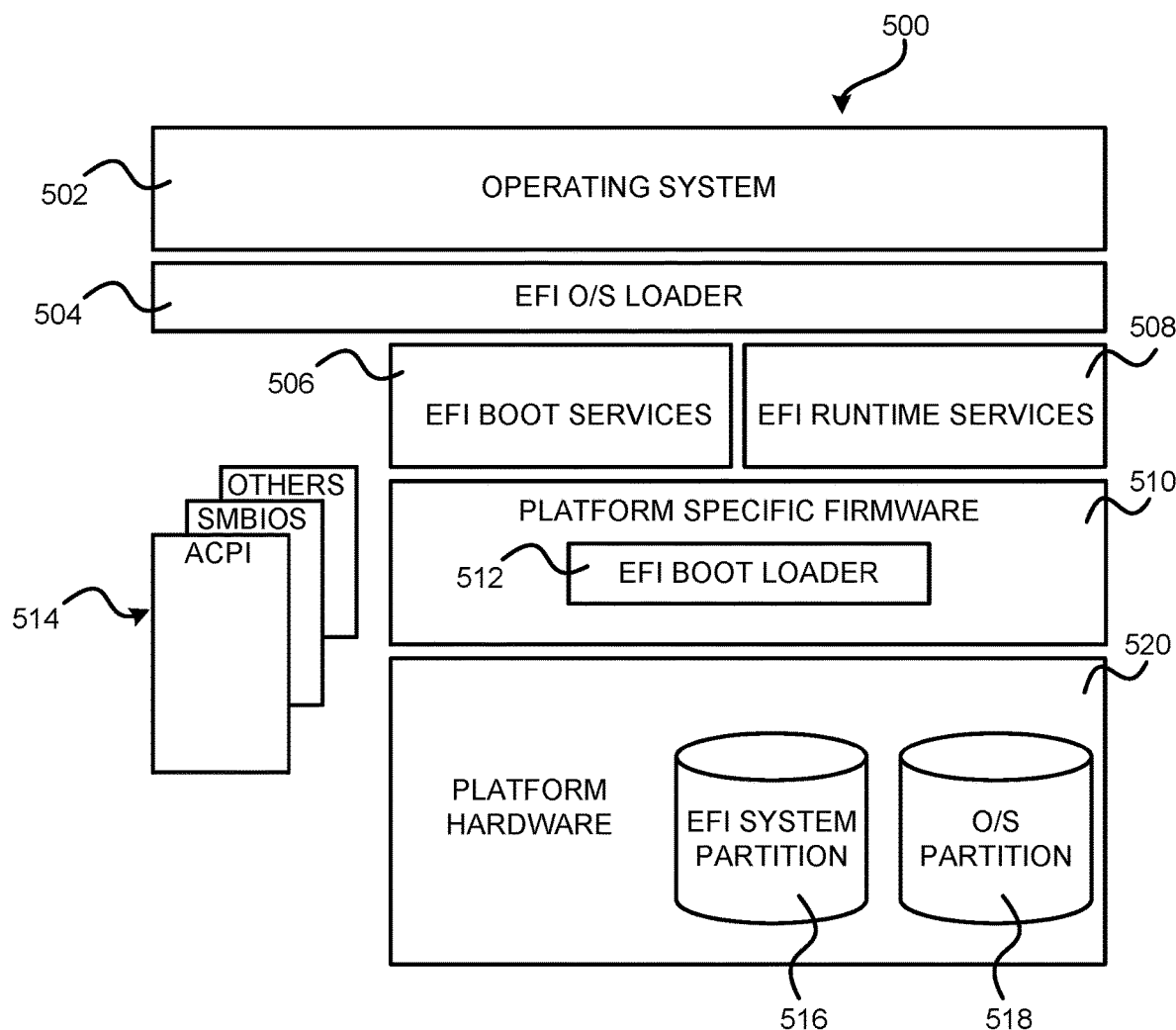
FIG. 5 is a software architecture diagram illustrating a software architecture for an extensible firmware interface ("EFI")-compliant firmware that provides an operating environment for the technologies presented herein in one particular configuration.

Turning now to FIG. 5, a software architecture diagram will be described that illustrates an architecture for a Unified Extensible Firmware Interface ("UEFI") Specification-compliant firmware 500 that can be configured to provide and/or utilize aspects of the technologies disclosed herein. In particular, the firmware architecture shown in FIG. 5 can be utilized to implement the firmware 114 described above. The firmware 114 can also be implemented in other ways in other configurations.

The UEFI Specification describes an interface between an operating system 502 and a UEFI Specification-compliant firmware. The UEFI Specification also defines an interface that a firmware can implement, and an interface that an operating system 502 (which might be referred to herein as an "OS") can use while booting. How a firmware implements the interface can be left up to the manufacturer of the firmware. The UEFI Specification also defines a way for an operating system 502 and a firmware to exchange information necessary to support the operating system boot process. The term "UEFI Specification" used herein refers to both the EFI Specification developed by INTEL CORPORATION and the UEFI Specification managed by the UEFI FORUM.

As shown in FIG. 5, the architecture can include platform hardware 520, such as that described below with regard to FIG. 6, and an operating system 502. A boot loader 512 for the operating system 502 can be retrieved from the UEFI system partition 516 using a UEFI operating system loader 504. The UEFI system partition 516 can be an architecturally shareable system partition. As such, the UEFI system partition 516 can define a partition and file system designed to support safe sharing of mass storage between multiple vendors. An OS partition 518 can also be utilized.

Once started, the UEFI OS loader 504 can continue to boot the complete operating system 502. In doing so, the UEFI OS loader 504 can use UEFI boot services 506, an interface to other supported specifications to survey, comprehend, and initialize the various platform components and the operating system software that manages them. Thus, interfaces 514 from other specifications can also be present on the system. For example, the ACPI and the System Management BIOS ("SMBIOS") specifications can be supported.

UEFI boot services 506 can provide interfaces for devices and system functionality used during boot time. UEFI runtime services 508 can also be available to the UEFI OS loader 504 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 502 and system firmware, the Framework is a group of specifications that together describe a firmware implementation that has been designed to perform the full range of operations that are required to initialize a platform from power on through transfer of control to the operating system 502. The specifications that make up the Framework, which are also available from INTEL CORPORATION, are also expressly incorporated herein by reference.

Figure 6:
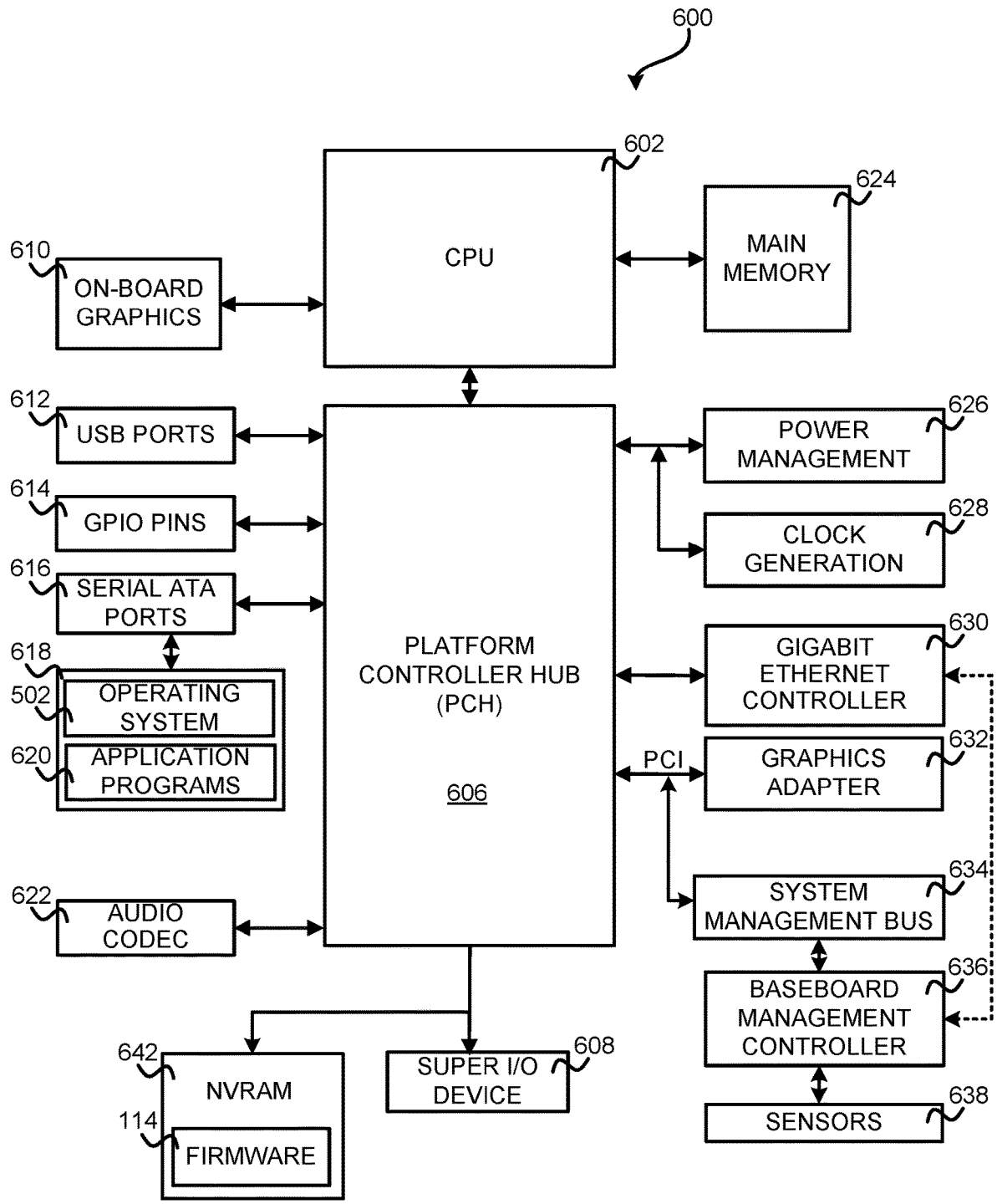
FIG. 6 is a computer architecture diagram that shows an illustrative architecture for a computer that can provide an operating environment for the technologies disclosed herein.

Referring now to FIG. 6, a computer architecture diagram that illustrates an illustrative architecture for a computer that can provide an illustrative operative environment for the technologies presented herein will be described. For example, and without limitation, the computer architecture shown in FIG. 6 can be utilized to implement the management server computer and/or any of the other computing systems disclosed herein.

FIG. 6 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 6 shows an illustrative computer architecture for a computer 600 that can be utilized in the implementations described herein. The illustrative computer architecture shown in FIG. 6 is for the computer 600 that includes a baseboard, or "motherboard", which is a printed circuit board to which a multitude of components or devices can be connected by way of a system bus or other electrical communication path. In one illustrative configuration, a central processing unit ("CPU") 602 operates in conjunction with a Platform Controller Hub ("PCH") 606. The CPU 602 is a central processor that performs arithmetic and logical operations necessary for the operation of the computer 600. The computer 600 can include a multitude of CPUs 602. Each CPU 602 might include multiple processing cores.

The CPU 602 provides an interface to a random access memory ("RAM") used as the main memory 624 in the computer 600 and, possibly, to an on-board graphics adapter 632. The PCH 606 provides an interface between the CPU 602 and the remainder of the computer 600.

The PCH 606 can also be responsible for controlling many of the input/output functions of the computer 600. In particular, the PCH 606 can provide one or more universal serial bus ("USB") ports 612, an audio codec 622, a Gigabit Ethernet Controller 630, and one or more general purpose input/output ("GPIO") pins 614. The USB ports 612 can include USB 2.0 ports, USB 3.0 ports and USB 3.1 ports among other USB ports. The audio codec 622 can include Intel High Definition Audio, Audio Codec '97 ("AC'97") and Dolby TrueHD among others.

The PCH 606 can also include functionality for providing networking functionality through a Gigabit Ethernet Controller 630. The Gigabit Ethernet Controller 630 is capable of connecting the computer 600 to another computer via a network. Connections which can be made by the Gigabit Ethernet Controller 630 can include LAN or WAN connections. LAN and WAN networking environments are commonplace in offices, enterprise-wide computer networks, intranets, and the Internet.

The PCH 606 can also provide a bus for interfacing peripheral card devices such as a graphics adapter 632. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 606 can also provide a system management bus 634 for use in managing the various components of the computer 600. Additional details regarding the operation of the system management bus 634 and its connected components are provided below. Power management circuitry 626 and clock generation circuitry 628 can also be utilized during the operation of the PCH 606.

The PCH 606 is also configured to provide one or more interfaces for connecting mass storage devices to the computer 600. For instance, according to one configuration, the PCH 606 includes a serial advanced technology attachment ("SATA") adapter for providing one or more serial ATA ports 616. The serial ATA ports 616 can be connected to one or more mass storage devices storing an OS, such as OS 502 and application programs (like the firmware tool 310), such as a SATA disk drive 618. As known to those skilled in the art, an OS 502 comprises a set of programs that control operations of a computer and allocation of resources. An application program is software that runs on top of the operating system 502, or other runtime environment, and uses computer resources to perform application specific tasks desired by the user.

According to one configuration, the OS 502 comprises the LINUX operating system. According to another configuration, the OS 502 comprises the WINDOWS operating system from MICROSOFT CORPORATION. According to another configuration, the OS 502 comprises the UNIX operating system. It should be appreciated that other operating systems can also be utilized.

The mass storage devices connected to the PCH 606, and their associated computer-readable storage media, provide non-volatile storage for the computer 600. Although the description of computer-readable storage media contained herein refers to a mass storage device, such as a hard disk or CD-ROM drive, it should be appreciated by those skilled in the art that computer-readable storage media can be any available media that can be accessed by the computer 600.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 600.

A low pin count ("LPC") interface can also be provided by the PCH 606 for connecting a Super I/O device 608. The Super I/O device 608 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 640 for storing firmware 604 that includes program code containing the basic routines that help to start up the computer 600 and to transfer information between elements within the computer 600.

It should be appreciated that the program modules disclosed herein, including the firmware 604, can include software instructions that, when loaded into the CPU 602 and executed, transform a general-purpose computer 600 into a special-purpose computer 600 customized to facilitate all, or part of, the operations disclosed herein. As detailed throughout this description, the program modules can provide various tools or techniques by which the computer 600 can participate within the overall systems or operating environments using the components, logic flows, and/or data structures discussed herein.

The CPU 602 can be constructed from any number of transistors or other circuit elements, which can individually or collectively assume any number of states. More specifically, the CPU 602 can operate as a state machine or finite-state machine. Such a machine can be transformed to a second machine, or a specific machine, by loading executable instructions contained within the program modules. These computer-executable instructions can transform the CPU 602 by specifying how the CPU 602 transitions between states, thereby transforming the transistors or other circuit elements constituting the CPU 602 from a first machine to a second machine, wherein the second machine can be specifically configured to perform the operations disclosed herein. The states of either machine can also be transformed by receiving input from one or more user input devices, network interfaces (such as the Gigabit Ethernet Controller 630), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 624 and/or NVRAM 604. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described briefly above, the PCH 606 can include a system management bus 634. When utilized to implement the management server computer 102, the system management bus 634 can include a BMC 636. When utilized to implement the managed client computer 106, a BMC 636 is not included. As discussed above, the BMC 636 is a microcontroller that monitors operation of the computer 600. In a more specific configuration, the BMC 636 monitors health-related aspects associated with the computer 600, such as, but not limited to, the temperature of one or more components of the computer 600, speed of rotational components (e.g., spindle motor, CPU fan, etc.) within the computer 600, the voltage across or applied to one or more components within the computer 600, and the available and/or used capacity of memory devices within the computer 600. To accomplish these monitoring functions, the BMC 636 is communicatively connected to one or more components by way of the system management bus 634. As also discussed above, the managed client computer 106 does not include a BMC 636.

In one configuration, these components include sensor devices 638 for measuring various operating and performance-related parameters within the computer 600. The sensor devices 638 can be either hardware or software based components configured or programmed to measure or detect one or more of the various operating and performance-related parameters.

The BMC 636 functions as the master on the system management bus 634 in most circumstances, but can also function as either a master or a slave in other circumstances. Each of the various components communicatively connected to the BMC 636 by way of the system management bus 634 is addressed using a slave address. The system management bus 634 is used by the BMC 636 to request and/or receive various operating and performance-related parameters from one or more components, which are also communicatively connected to the system management bus 634.

It should be appreciated that the functionality provided by the computer 600 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 600 might not include all of the components shown in FIG. 6, can include other components that are not explicitly shown in FIG. 6, or might utilize an architecture completely different than that shown in FIG. 6.

Based on the foregoing, it should be appreciated that technologies for providing platform management for computing systems without BMCs have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:
   exposing, by a server computer, a first web services interface to one or more management client computers for
      providing management data for one or more managed client computers to the one or more management client computers, and
      receiving management commands from the one or more management client computers for performance at the one or more managed client computers;
   exposing, by the server computer, a second web services interface for
      receiving second management data from a firmware executing on the one or more managed client computers at a boot time of the one or more managed client computers, and
      providing the management commands to the firmware executing on the one or more managed client computers at the boot time of the one or more managed client computers;
   responsive to receiving a first management command from a first management client computer of the one or more management client computers, queueing the first management command for provision to a first managed client computer during a next boot time of the first managed client computer; and
   transmitting the first management command to the first managed client computer during the next boot time;
   wherein the one or more managed client computers are not equipped with a baseboard management controller (BMC).

2. The computer-implemented method of claim 1, wherein the first web services interface comprises a representational state transfer (RESTful) interface over secure Hypertext Transfer Protocol (HTTPS) that utilizes a JavaScript Object Notation (JSON) format that is based on Open Data Protocol (OData).

3. The computer-implemented method of claim 1, wherein the second web services interface comprises a representational state transfer (RESTful) interface over secure Hypertext Transfer Protocol (HTTPS) that utilizes a JavaScript Object Notation (JSON) format that is based on Open Data Protocol (OData).

4. The computer-implemented method of claim 1, wherein at least one of the management commands comprises obtaining the second management data from the one or more managed client computers, the management data being indicative of at least one of a configuration parameter of a first managed client computer of the one or more managed client computers or an operational parameter of the first managed client computer.

5. The computer-implemented method of claim 1, wherein at least one of the management commands comprises initiating an update of the firmware executing on the one or more managed client computers.

6. The computer-implemented method of claim 1, wherein at least one of the management commands comprises initiating a logical storage volume recovery for at least one of the one or more managed client computers.

7. The computer-implemented method of claim 1, wherein at least one of the management commands comprises modifying a configuration of at least one of the one or more managed client computers.

8. The computer-implemented method of claim 1, wherein at least one of the management commands comprises initiating diagnostics on at least one of the one or more managed client computers.

9. A non-transitory computer-readable storage medium having computer-executable instructions stored thereupon which, when executed by a computer not equipped with a baseboard management controller (BMC), cause the computer to:
   execute a management module in a firmware of the computer, the management module configured to
      obtain management data for the computer during a time period after the firmware begins executing and before an operating system for the computer begins to load in a memory device of the computer, the management data being indicative of at least one of configuration parameters of the computer or operational parameters of the computer,
      provide the management data to a web services interface exposed by a management server computer during the time period, wherein the web services interface provides access to a representational state transfer (RESTful) service, the management data provided by means of program code to send and receive resources from the RESTful service,
      receive one or more management commands from the management server computer during the time period, wherein the management server computer queued the one or more management commands prior to the time period, and
      cause the one or more management commands to be performed by the firmware of the computer; wherein the managed client computer is not equipped with a baseboard management controller (BMC).

10. The non-transitory computer-readable storage medium of claim 9, wherein the web services interface comprises a RESTful interface over secure Hypertext Transfer Protocol (HTTPS) that utilizes a JavaScript Object Notation (JSON) format that is based on Open Data Protocol (OData).

11. The non-transitory computer-readable storage medium of claim 9, wherein at least one of the one or more management commands comprises initiating an update of the firmware.

12. The non-transitory computer-readable storage medium of claim 9, wherein at least one of the one or more management commands comprises initiating a logical storage volume recovery for the computer.

13. The non-transitory computer-readable storage medium of claim 9, wherein at least one of the one or more management commands comprises modifying a configuration of the firmware.

14. The non-transitory computer-readable storage medium of claim 9, wherein at least one of the one or more management commands comprises initiating diagnostics on the computer.

15. A system, comprising:
one or more processors; and
at least one non-transitory computer-readable storage medium having computer-executable instructions stored thereupon which, when executed by the one or more processors, cause the system to:
receive, via a first web services interface exposed by a server computer, management data from a firmware executing on a managed client computer at a boot time of the managed client computer;
provide, via a second web services interface exposed by the server computer, at least a portion of the management data to a management client computer;
receive, via the second web services interface, one or more management commands from a management client computer;
queue the one or more management commands for provision to the managed client computer during a next boot time of the managed client computer; and
provide, via the first web services interface, the one or more management commands to the firmware executing on the managed client computer during the next boot time; wherein the managed client computer is not equipped with a baseboard management controller (BMC).

16. The system of claim 15, wherein the first web services interface comprises a representational state transfer (RESTful) interface over secure Hypertext Transfer Protocol (HTTPS) that utilizes a JavaScript Object Notation (JSON) format that is based on Open Data Protocol (OData).

17. The system of claim 15, wherein the second web services interface comprises a representational state transfer (RESTful) interface over secure Hypertext Transfer Protocol (HTTPS) that utilizes a JavaScript Object Notation (JSON) format that is based on Open Data Protocol (OData).

18. The system of claim 15, wherein the one or more management commands comprise one or more of a command to initiate an update of the firmware, a command to initiate a logical storage volume recovery for the managed client computer, a command to modify a configuration of the firmware, or a command to initiate diagnostics on the managed client computer.

* * * * *